United States Patent [19]
Krawczak et al.

[11] Patent Number: 5,865,583
[45] Date of Patent: Feb. 2, 1999

[54] SEALING WASHER ASSEMBLY

[75] Inventors: Lawrence E. Krawczak, Sterling Heights; Paul B. McCormick, Royal Oak, both of Mich.

[73] Assignee: Chrysler Corporation, Auburn Hills, Mich.

[21] Appl. No.: 971,807

[22] Filed: Nov. 17, 1997

[51] Int. Cl.⁶ ............................. F16B 33/00; F16B 37/14
[52] U.S. Cl. .................... 411/369; 411/431; 411/533; 411/542
[58] Field of Search ...................... 411/369, 372, 411/373, 377, 431, 542, 533, 531, 915

[56] References Cited

U.S. PATENT DOCUMENTS

| | | | |
|---|---|---|---|
| 2,353,477 | 7/1944 | Koppel | 411/369 X |
| 3,298,272 | 1/1967 | Henderson | 411/373 |
| 3,485,134 | 12/1969 | Ott | 411/531 X |
| 4,826,380 | 5/1989 | Henry | 411/377 |
| 5,199,837 | 4/1993 | Goss | 41/377 X |

FOREIGN PATENT DOCUMENTS

| | | | |
|---|---|---|---|
| 636531 | 3/1962 | Italy | 411/431 |
| 883340 | 11/1961 | United Kingdom | 411/369 |

*Primary Examiner*—Neill Wilson
*Attorney, Agent, or Firm*—Thomas G. Pasternak

[57] ABSTRACT

A sealing washer assembly includes a threaded fastener, a nut and a resilient member attached to the nut and washer or screw and washer. The resilient member, typically a polymer of propylene, ethylene or other suitable material, is oversized with respect to the nut. The assembly is useful for connecting one member to another via an opening in the first member, and particularly, provides a system for sealing the opening against the passage of fluid, such as air.

7 Claims, 1 Drawing Sheet

U.S. Patent            Feb. 2, 1999            5,865,583
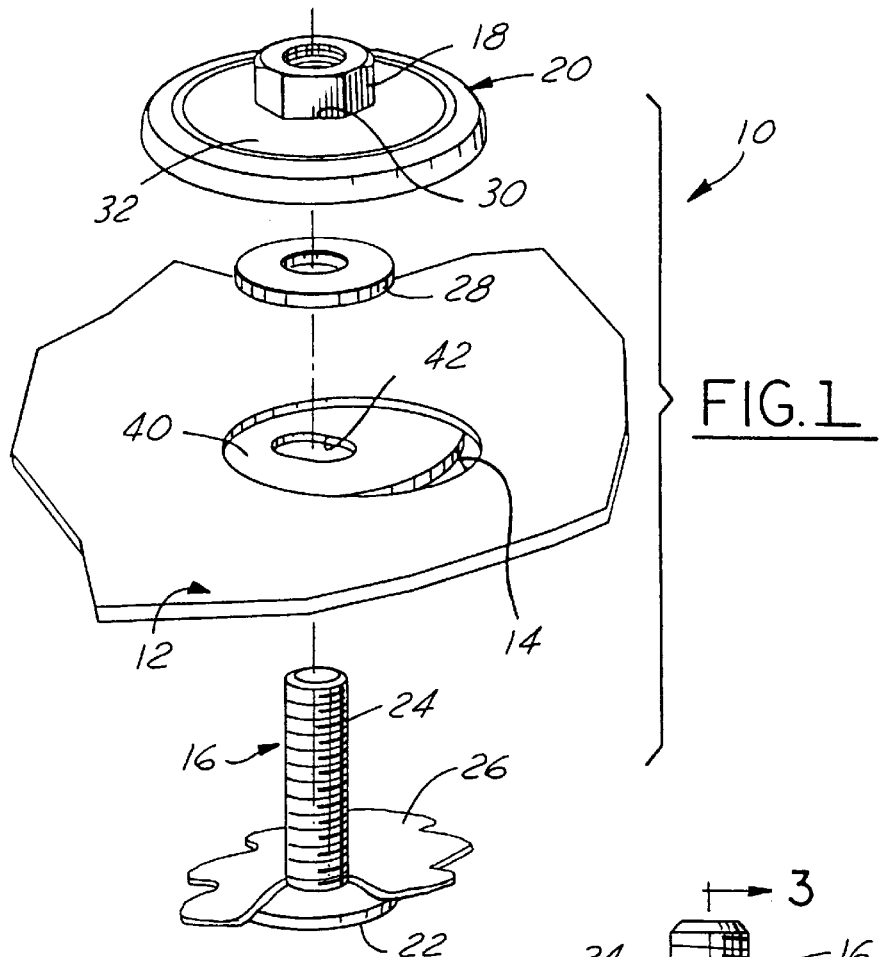
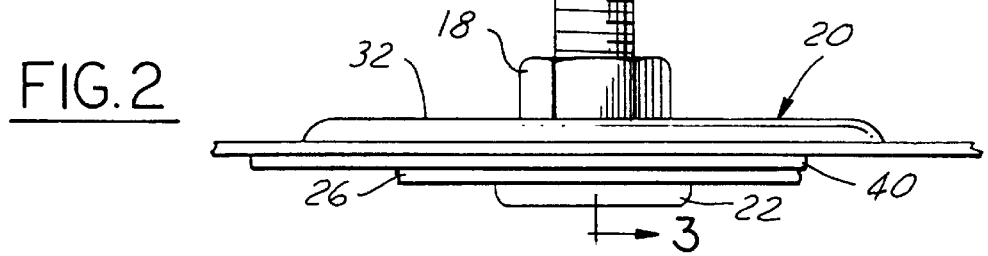
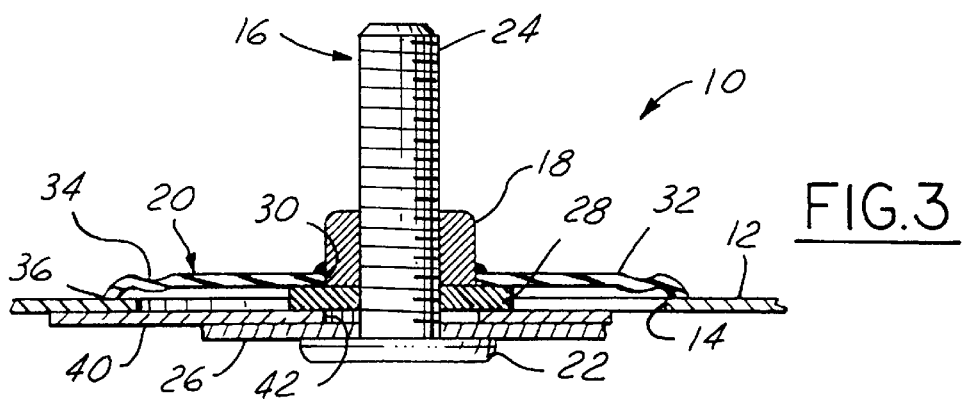

SEALING WASHER ASSEMBLY

BACKGROUND OF THE INVENTION

1. Technical Field

The present invention is in the field of fasteners such as threaded bolts and nuts used with sheet materials such as metal and the like. Particularly, the present invention relates to a sealing washer assembly including a threaded fastener and a resilient member oversized with respect to the threaded fastener. More particularly, the present invention relates to an assembly for attaching one member to another member, via an opening in the first member and then sealing the attachment against the passage of fluid, including but not limited to air, and for preventing noise transmission through the connection.

2. Discussion

A nut and bolt combination is a well known device for securely fastening two or more members. Generally speaking, a metal washer encircles the bolt shaft and is interposed between the nut and the member against which the nut is tightened. Location of a washer between rotatable and static members is known to promote a fit of the fastened members which is more resistant to loosening from vibration. The nuts, bolts and washers in common use are often manufactured of metal but modification of this arrangement has been suggested for various purposes over the years.

For example, U.S. Pat. No. 2,982,573 to McKee, Jr. describes a composite sealing washer having an annular sealing portion constructed of neoprene rubber that is received within a cup-shaped flexible metal member. A washer is used in conjunction with a conventional nut and bolt to fasten two plates together. The annular sealing portion is oversized so that when the nut is tightened onto the bolt, the material of the sealing portion spreads into a gap between the bolt and plates. It is also known to secure a rubber gasket or other suitable flexible material to a washer with adhesive for sealing the aperture through which a fastener passes, for example, when sealing an opening in an automotive vehicle. The gasket is positioned to be compressed between the washer and the workpiece.

One longstanding problem with known sealing washers arises when the gasket is compressed between the clamped components of the formed joint and subsequently relaxes, leading to leakage. Although sealing washers are generally considered low-cost items in themselves, they can be very time consuming to replace in the event of failure.

Another problem with known assemblies is that, due to the compression of the gasket and the virtual metal contact effectual, noise can be transmitted through the assembly from the attached member into the other member.

SUMMARY OF THE INVENTION

Accordingly, it is a principal objective of the present invention to provide sealing washer assembly that has a sealing feature integral with a nut and fastener combination without adversely effecting joint integrity.

It is another principal objective to provide a sealing washer assembly that prevents the transmission of noise through the assembly.

It is a more particular objective of the present invention to providing a sealing washer assembly having a flexible seal member carried by the nut, but not between, the clamped components of the assembly.

Additional objectives of the present invention include providing a sealing washer assembly having a seal which is not disposed within the clamped components, which is not limited by nut and/or washer size, which does not affect the torque/tension relationship of the fastener, and which does not affect washer rotation.

In one form, the present invention provides a sealing member for use in combination with a sealing washer assembly including a threaded fastener and a nut for connecting one member to another member via an opening in the first member and then sealing the opening. The sealing member includes an aperture for receiving one of the nut and a head of the threaded fastener. The sealing member further includes a radially extending flange adapted to completely cover the opening in the workpiece. Through incorporation of the sealing member, the sealing washer assembly prevents fluid from passing through the opening without being positioned between clamped elements of a joint established between the sealer washer assembly and the second member. This structure additionally prevents the transmission of noise through the attachment.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 1 is an exploded, partially cut-away perspective view of a sealing washer assembly constructed in accordance with the teachings of a preferred embodiment of the present invention shown arranged with an opening in the member to be sealed;

FIG. 2 is a side view of the sealing washer assembly of the present invention; and FIG. 3 is a sectional view taken along the line 3—3 of FIG. 2.

DETAILED DESCRIPTION OF THE PREFERRED EMBODIMENT

Referring to the drawings, a sealing washer assembly constructed in accordance with the teachings of the present invention is generally identified with reference numeral 10. The sealing washer assembly 10 is illustrated cooperatively arranged with first member 12 having an opening 14. Member 12 may be any object which is desired to be attached to a second member, in this case second member 26 (shown for simplicity as a flat plate). Second member 26 typically would be a component part that is being fastened such as a strut. In one particular use, the sealing washer assembly 10 is utilized in automotive applications to attach one object to another and to prevent air from passing through the attachment and noise from being transmitted. However, it will become apparent to those skilled in the art that the present invention has broad applicability for preventing fluid flow and noise transmission.

The sealing washer assembly 10 is shown to generally include a nut 18 and a sealing member 20. Much of the focus of the present invention is directed to the function and operation of the sealing member 20. The remaining elements of the sealing washer assembly 10 are largely conventional in construction and will only briefly be addressed. In this regard, the threaded fastener is shown to include a head 22 and an externally threaded shaft 24. The nut 18 includes a plurality of internal threads for engaging the external threads of the shaft 24. A washer 28 is rotatably positioned around fastener 16.

The sealing member 20 is unitarily constructed to include a centrally located aperture 30 and a radially extending flange or skirt 32. The central aperture 30 is hexagonal in shape and sized slightly smaller than the corresponding hexagonal dimensions of the nut 18 to prevent passage of fluid. In the embodiment illustrated, the sealing member 20 is generally circular and is formed to include a circular groove 34 positioned adjacent its periphery. The radially extending flange 32 is normally slightly cup-shaped, having a continuous peripheral edge 36 extending in an axial direction. The flange 32 extends substantially beyond the nut 18 in a radial direction.

In the embodiment illustrated, the sealing member 20 is preferably constructed of a polymer such as propylene, ethylene or another suitable material. It will be appreciated that the particular type of material chosen is largely dependent upon the temperatures to which the sealing washer assembly 10 will be exposed.

The sealing member 20 is carried by the nut 18. However, it will be understood that the sealing member 20 can be cooperatively associated with the head 32 of the threaded fastener 16, that is, it may be located on either side of the workpiece as is desired. The same principles moreover may be utilized with a screw and washer assembly. In the preferred embodiment illustrated, the slightly smaller dimensions of the aperture 30 compared to the nut 18 allow the sealing member 20 to be frictionally retained. In other applications, it will be understood that the sealing member 20 may be staked, bonded, press fit, located within a groove provided in the sides of the nut, or otherwise attached.

As shown throughout the drawings, the opening 14 in the workpiece 12 to be sealed is substantially larger than both of the washers 26 and 28. To facilitate attachment of the sealing washer assembly 10, a mounting plate 40 is attached to the workpiece 12. The mounting plate 40 includes an aperture 42 adapted to receive the shaft 24 of the fastener 16. The size of the sealing member 20 is chosen such that it entirely covers the opening 14.

After the shaft 24 is passed through the aperture 42, a joint is established through tightening of the nut 18 relative to the fastener 16. Metal to metal contact is established between the washer 28 and the mounting plate 40 and also between the captive washer 26 and the mounting plate 40. The cup-shape of the radially extending flange 32 of the sealing member 20 causes the continuous edge 36 to engage the workpiece 12 before metal to metal contact between the assembly 10 and the workpiece 12 is established. Compression from the nut 18 causes the continuous edge 36 to slightly deflect and the radially extending flange 32 to begin to flatten. Deflection of the sealing member 20 facilitates continuous contact between the continuous edge 36 and the workpiece 12. Since the sealing member 20 is not within the established joint, the joint is not subject to relaxation.

While the above description constitutes the preferred embodiment of the invention, it will be appreciated that the invention is susceptible to modification, variation, and change without departing from the proper scope or fair meaning of the accompanying claims. In this regard, the details of the construction of the sealing member 20, other than those defined herein, may vary to suit particular applications.

We claim:

1. A sealing washer assembly including a threaded fastener and a nut for sealing an opening in a workpiece, the improvement comprising a sealing member staked to the nut, said sealing member including an aperture for receiving one of the nut and a head of the threaded fastener, the sealing member including a radially extending flange adapted to completely cover the opening in the workpiece, whereby the sealing washer assembly prevents fluid from passing through the opening in the workpiece without being positioned between clamped elements of a joint established between the sealing washer assembly and the workpiece.

2. The assembly of claim 1 wherein said sealing member comprises a polymer.

3. A sealing washer assembly including a threaded fastener and a nut for sealing an opening in a workpiece, the improvement comprising a sealing member carried by the nut, said sealing member including an aperture through which the nut extends such that the nut is accessible, the sealing member including a radially extending flange adapted to completely cover the opening in the workpiece, whereby the sealing washer assembly prevents fluid from passing through the opening in the workpiece without being positioned between clamped elements of a joint established between the sealing washer assembly and the workpiece.

4. The sealing washer assembly of claim 3, wherein said sealing member is resiliently deflectable upon tightening of the nut.

5. The sealing washer assembly of claim 3, wherein said sealing washer is frictionally retained on the nut.

6. The sealing washer assembly of claim 3, wherein said sealing washer is bonded to the nut.

7. The sealing washer assembly of claim 3, wherein said sealing washer is staked to the nut.

* * * * *